May 20, 1941.    A. L. BLOUNT    2,242,845
ALKYLATION
Filed Aug. 14, 1939
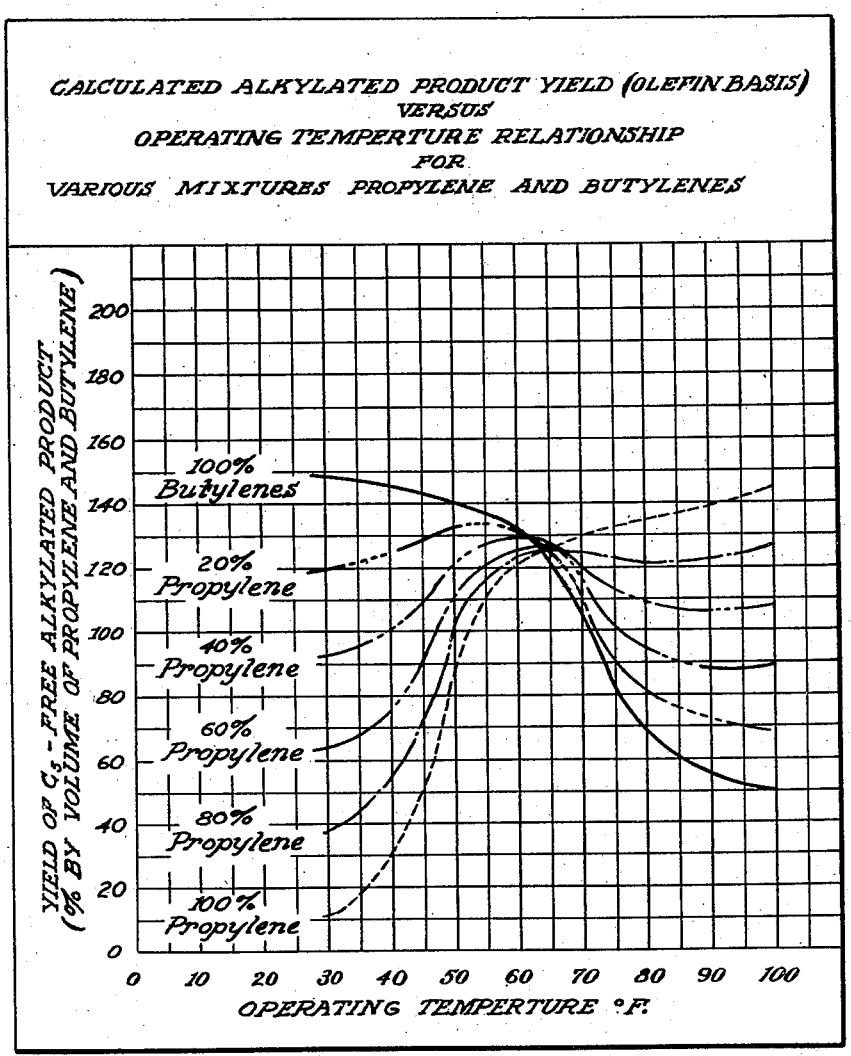
Arthur L. Blount
INVENTOR Patented May 20, 1941

2,242,845

UNITED STATES PATENT OFFICE 2,242,845

ALKYLATION

Arthur L. Blount, Palos Verdes Estates, Calif., assignor to Union Oil Company of California, Los Angeles, Calif., a corporation of California Application August 14, 1939, Serial No. 290,002

6 Claims. (Cl. 196—10)

This invention relates to a method of producing alkylated hydrocarbons. More specifically this invention is for the production of saturated side chain paraffinic hydrocarbons by reacting olefins with isoparaffins in the presence of a catalyst, such as strong sulphuric acid. These saturated side chain paraffinic hydrocarbons possess highly anti-detonating characteristics and are, therefore, valuable as constituents of motor fuel for internal combustion engines.

When one or more molecules of an olefin react with an isoparaffinic hydrocarbon an alkylated paraffinic hydrocarbon is produced which possesses a side chain and is saturated. This reaction between an olefin and an isoparaffin is, therefore, different from the reaction which takes place by the interaction between two olefin molecules which produces a "polymerized" hydrocarbon or a polymer.

The reaction between olefins and isoparaffins to form alkylated hydrocarbons may be promoted by such catalysts as aluminum chloride, chlorsulphonic acid or concentrated sulphuric acid. The present invention employs sulphuric acid as the catalyst. When I employ my process to produce the maximum yield of alkylated hydrocarbon on the basis of the acid I continuously use the acid until it has an apparent $H_2SO_4$ concentration of 80% (actually 91.0% $H_2SO_4$) at which concentration the acid is no longer an efficient alkylation catalyst. In other words, I may initiate the reaction between the olefins and the isoparaffins with sulphuric acid having an actual $H_2SO_4$ concentration between 98% and 103% and continue the use of this acid for further alkylation of olefins and isoparaffins until it has degraded to an apparent concentration of 80% $H_2SO_4$. During the continued use of the sulphuric acid it dissolves a certain portion of hydrocarbon materials. When the acid phase with its dissolved material shows by analysis on the weight basis an 80% $H_2SO_4$ content it is of little value as an alkylation catalyst. If this acid having an apparent concentration of 80% is separated from its hydrocarbon content it will be found to possess an actual $H_2SO_4$ concentration of about 91%. Therefore, when I refer to apparent acid concentrations in this specification I mean the $H_2SO_4$ concentration of the acid containing dissolved hydrocarbons.

When I employ my process to produce the maximum amount of alkylated product on the olefin basis, the acid should not be permitted to reach an apparent $H_2SO_4$ content substantially lower than 88.0% and preferably it should be employed between the apparent concentrations of 95% $H_2SO_4$ to 88% $H_2SO_4$. Furthermore, the optimum concentration of acid to employ to obtain the maximum yield of alkylated hydrocarbon on the olefin basis is about 91% apparent $H_2SO_4$ concentration which corresponds to an actual $H_2SO_4$ concentration of 96%. I, therefore, may initiate the reaction between the olefin and isoparaffinic feed stocks with 98% to 103% $H_2SO_4$ and as the $H_2SO_4$ concentration degrades through continued use I may fortify this acid with the addition of more concentrated sulphuric acid (as for example 98% to 103% $H_2SO_4$) to maintain the strength of this acid between an apparent concentration range from 95.0% $H_2SO_4$ to 88% $H_2SO_4$ and preferably around an apparent concentration of 91% $H_2SO_4$. Instead of fortifying the partially spent acid with more concentrated sulphuric acid I may obtain the same result by contacting the partially spent sulphuric acid with sulphur trioxide. By withdrawing the partially spent acid from the alkylation zone and countercurrently contacting this acid with sulphur trioxide the strength of the acid may be maintained within the optimum apparent concentration range of from 95% to 88% $H_2SO_4$ and preferably around an apparent $H_2SO_4$ content of 91%.

In carrying out the reaction between the olefins and the isoparaffins in the presence of the catalyst to produce the alkylated product it is desirable to maintain a high ratio of isoparaffin to olefin. This high ratio of isoparaffin to olefin favors alkylation and minimizes polymerization. This ratio should be in the order of at least five parts of isoparaffin to one part of the olefin and preferably ten parts to fifty parts of the isoparaffin to one part of the olefin. Furthermore, sufficient pressure should be imposed on the olefins and isoparaffins to maintain these hydrocarbons in a liquid state during contact with the sulphuric acid.

When isobutane is alkylated with butylene in the presence of sulphuric acid the optimum temperatures to be employed lie between 30° F. and 60° F. and preferably around 45° F. Furthermore, when propylene is alkylated with isobutane in the presence of sulphuric acid the optimum temperatures to be employed lie between 70° F. and 100° F. and preferably around 80° F. However, neither of these temperature ranges is particularly suitable for the alkylation of isobutane with a mixture of propylene and butylenes in the presence of sulphuric acid.

I have discovered a method whereby the optimum temperature as well as the optimum temperature range may be determined for the alkylation of isobutane with any mixture of propylene and butylene in the presence of sulphuric acid having an $H_2SO_4$ content between an initial actual 103.5% to an apparent 80.0%. When I use the term propylene or butylene I mean either the gaseous olefins or the polymers of either propylene or butylene, since either mixtures of gaseous propylene and butylene or mixtures of polymerized propylene and butylene may be used in my process. Furthermore, gaseous propylene or butylene may be mixed with polymerized propylene or butylene and the resulting mixture employed in my process.

My invention will be better understood from a study of the accompanying drawing.

The figure shows a series of curves which represent the yield of alkylated hydrocarbons on the olefin basis produced at various temperatures by alkylating butylenes with isobutane, propylene with isobutane and mixtures of propylene and butylenes with isobutane using sulphuric acid of 98% H₂SO₄ initial concentration in each case as the catalyst.

Referring to the drawing, it will be noted that the optimum temperature for alkylating a mixture containing 20% propylene and 80% butylene with isobutane in the presence of sulphuric acid is 54° F. The optimum range of temperature for this mixture is in the order of 45° F. to 65° F. For the alkylation of an olefin mixture containing 40% propylene and 60% butylene with isobutane in the presence of concentrated sulphuric acid the optimum temperature is about 61° F. and the optimum temperature range is between 50° F. and 70° F. For the alkylation of an olefin mixture containing 80% propylene and 20% butylene with isobutane in the presence of 98% H₂SO₄, the optimum temperature is about 67° F. and the optimum temperature range between 60° F. and 80° F.

I find that the optimum temperature at which the maximum yield of product can be obtained from the alkylation of propylene-butylene mixtures or solutions of these olefins in inert hydrocarbons, using isobutane as the other reactant and using 98% sulphuric acid as the catalyst until it has degraded to an apparent 80% by weight H₂SO₄ may be determined by the following equation:

$$Y = 0.25\ X + 47$$

Where $Y$ = temperature of maximum yield in °F. and
$X$ = propylene content of the olefin feed stock expressed as % by volume of the propylene plus butylene in the feed.

From the above it is clear that in a mixture consisting of 50% inert hydrocarbons, 25% propylene and 25% butylene, X would equal 50%.

By reference to the curves it is also apparent that the optimum temperature range within which the maximum yield of alkylated product can be obtained from the alkylation of propylene-butylene mixtures or solutions of these olefins in inert hydrocarbons using isobutane as the other reactant and using sulphuric acid between the concentrations of 98% and an apparent 80% by weight H₂SO₄ may be expressed as lying between $$Y = 0.25\ X + 40 \text{ and } Y = 0.25\ X + 55$$

where Y equals temperature of maximum yield in °F. and X equals propylene content of the olefin feed stock expressed in percent by volume of the propylene plus butylenes in the feed.

As explained above, if reference is made to the drawing, it will be noted that a maximum yield of alkylated hydrocarbon is obtained (on the olefin basis) at about 54° F. if an olefin mixture containing 20% propylene and 80% butylene is reacted with isobutane in the presence of H₂SO₄ between an actual H₂SO₄ content of 98% and an apparent concentration of 80% (both H₂SO₄ concentrations calculated on a weight basis).

Applying the above data to the formula:

$$Y = 0.25\ X + 47$$
$$Y = 0.25 \times 20 + 47$$
$$Y = 52$$

The temperature determined by means of this equation is within 2° F. of the optimum temperature over the range of concentrations from 10 to 90% propylene.

The foregoing is not to be taken as limiting but only as illustrative of my invention as many variations can be made by those skilled in the art coming under the scope of the following claims.

I claim:

1. In a process of reacting an olefin mixture containing propylene and butylene with isobutane in the presence of concentrated sulphuric acid comprising conducting the reaction substantially at a temperature determined by the equation $$Y = 0.25\ X + 47$$

where Y is the temperature in °F. to be employed and X represents the propylene content expressed as percent by volume of the propylene plus butylene in the olefin mixture.

2. In a process of reacting an olefin mixture containing propylene and butylene with isobutane in the presence of concentrated sulphuric acid comprising conducting the reaction within the temperature range determined by the expressions $$Y = 0.25\ X + 40 \text{ and } Y = 0.25\ X + 55$$

where Y is the temperature in °F. to be employed and X represents the propylene content expressed as percent by volume of the propylene plus butylene in said olefin mixture.

3. A process for the production of alkylated hydrocarbons which comprises commingling an olefin mixture containing propylene and butylene with isobutane and with sulphuric acid at a temperature determined by the expression $$Y = 0.25\ X + 47$$

where Y represents the temperature in °F. to be employed and X represents the propylene content expressed as percent by volume of the propylene plus butylene in said olefin mixture.

4. A process as claimed in claim 1 in which the concentration of the sulphuric acid employed lies between an actual 98.0% H₂SO₄ by weight and an apparent 80% H₂SO₄ by weight.

5. A process as claimed in claim 2 in which the concentration of the sulphuric acid employed lies within the limits of 98.0% H₂SO₄ by weight and an apparent 80% H₂SO₄ by weight.

6. A process for the production of alkylated hydrocarbons which comprises contacting isobutane and an olefin mixture containing propylene and butylene with sulphuric acid having an H₂SO₄ content by weight between about 98% and 92% and maintaining a temperature during said contact within the limits determined by the expressions $$Y = 0.25\ X + 40 \text{ and } Y = 0.25\ X + 50$$

where Y represents the temperature in °F. and X represents the propylene content expressed as percent by volume of the propylene plus butylene in said olefin mixture.

ARTHUR L. BLOUNT.